(12) United States Patent
Takeda et al.

(10) Patent No.: US 6,361,742 B2
(45) Date of Patent: Mar. 26, 2002

(54) SOLDER ALLOY COMPOSITION

(75) Inventors: Naoko Takeda; Kazutaka Habu, both of Tokyo; Kazushi Yamauchi, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/725,609

(22) Filed: Nov. 29, 2000

Related U.S. Application Data

(62) Division of application No. 09/398,754, filed on Sep. 17, 1999, now Pat. No. 6,228,322.

(30) Foreign Application Priority Data

Sep. 24, 1998 (JP) .......................................... P10-270185

(51) Int. Cl.[7] .............................................. C22C 13/00
(52) U.S. Cl. ....................................................... 420/557
(58) Field of Search ................................ 420/557, 560, 420/561, 562

(56) References Cited

U.S. PATENT DOCUMENTS 5,527,628 A * 6/1996 Anderson et al. ............ 428/647
5,863,493 A * 1/1999 Achari et al. ................ 420/557

* cited by examiner

Primary Examiner—George Wyszomierski
Assistant Examiner—Janelle Combs-Morillo
(74) Attorney, Agent, or Firm—Bell, Boyd & Lloyd LLC

(57) ABSTRACT

A lead-free solder composition having superior mechanical strength is produced by adding a rare earth element to a Sn—Ag alloy or a Sn—Ag—Bi—Cu alloy.

3 Claims, 1 Drawing Sheet

FIGURE
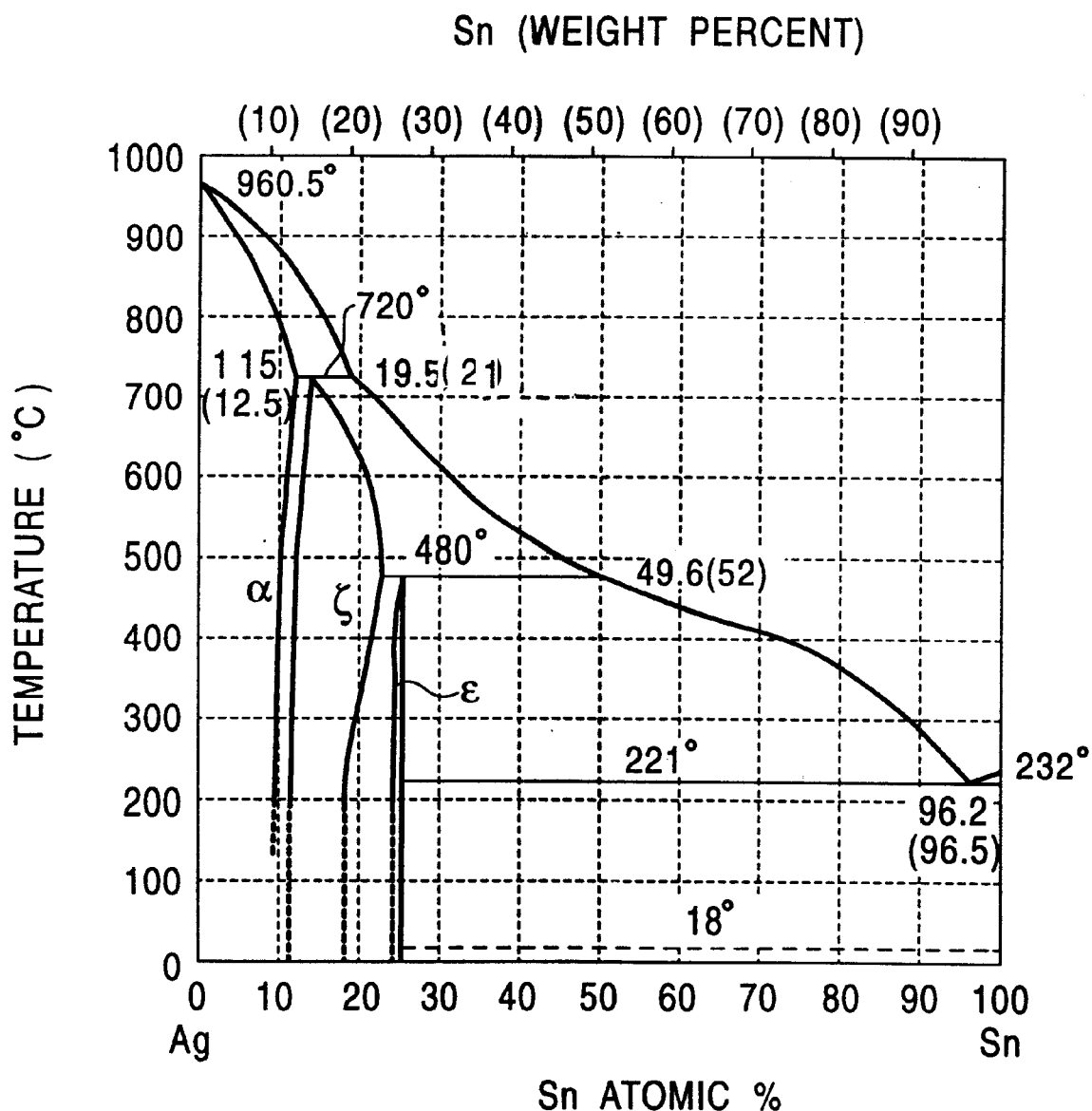

SOLDER ALLOY COMPOSITION

RELATED APPLICATION DATA

This application is a divisional of application Ser. No. 09/398,754, filed Sep. 17, 1999 now U.S. Pat. No. 6,228,322.

The instant application claims priority to Japanese Application No. P10-270185, filed Sep. 24, 1998, which application is herein incorporated by reference to the extent permitted by law.

BACKGROUND OF THE INVENTION

1. Field of the Invention

The present invention relates to solder alloy compositions, more particularly to a low melting point, lead-free solder alloy composition provided with improved properties, primarily in mechanical strength.

2. Description of the Related Art

When electronic parts, etc., are electrically connected to and are fixed on circuit boards and the like, a Sn—Pb eutectic solder is most widely used at present. The Sn—Pb solder has a eutectic alloy composition of 63 percent by weight of Sn and 37 percent by weight of Pb, and has a eutectic temperature of 183° C. The Sn—Pb eutectic solder alloy composition exhibits superior performance in many respects, such as temperature characteristics, soldering characteristics, and reliability, and forms the basis of mounting technology in the electronics industry.

Recently, wastes containing Pb have become a problem from the point of view of environmental protection and the enactment of lead-control regulations is anticipated in the United States, Europe, and Japan. The Sn—Pb eutectic solder will also be regulated.

Accordingly, a lead-free solder is desired, which has equivalent performance to that of the Sn—Pb eutectic solder in workability, such as soldering characteristics, temperature characteristics, and reliability.

Alloy compositions proposed up to the present as candidates for a lead-free solder are mainly composed of Sn, such as low melting point alloys including a Sn—Bi alloy (57 percent by weight of Bi and a eutectic temperature of 139° C.) and a Sn—In alloy (52 percent by weight of In and a eutectic temperature of 117° C.). In addition, there is a Sn—Ag alloy with a relatively high melting point (3.5 percent by weight of Ag and a eutectic temperature of 221° C.).

When compared with the Sn—Pb eutectic solder, however, all compositions described above have problems, such as decrease of wettability, decrease of fatigue strength, generation of dross (an oxide film on surfaces of molten solder), and higher cost. Among the compositions described above, the Sn—Ag alloy, even though it has a drawback of having a relatively higher melting point, is regarded as the most likely candidate by virtue of superior properties of oxidation resistance and soldering characteristics. A phase diagram of the Sn—Ag alloy is shown in the FIGURE.

A Sn—Ag alloy having Bi and Cu, 90Sn-7.5Bi-2Ag-0.5Cu (each numeral represents percent by weight), is named Alloy-H and the melting point thereof decreases to approximately 210° C. While having good thermal cycle characteristics, Alloy-H is hard and brittle due to a large amount of Bi contained, so that it is difficult to make a solder wire. A problem of lift-off is also noted.

Consequently, the inventors of the present invention proposed a lead-free Sn—Ag alloy solder disclosed in Japanese Patent Application No. 9-348212, in which the Bi content was reduced to approximately half, that is, 4 percent by weight, and a small amount of Ge was added to compensate for the reduced workability and reliability. A typical alloy composition is a five-component alloy of 93.4Sn-2Ag-4Bi-0.5Cu-0.1Ge (each numeral represents percent by weight).

The five-component lead-free alloy solder shows superior properties; however, degradation of properties is observed when used in a flow process and an elongation thereof is relatively small. Moreover, application of the alloy solder was limited by the extremely high cost of Ge.

SUMMARY OF THE INVENTION

Accordingly, taking the problems in the conventional technologies into consideration, it is an object of the present invention to provide a lead-free solder composition having superior mechanical properties including stress and elongation, and having properties equivalent to those of conventional lead-free solder in a melting point and wettability.

The inventors accomplished the present invention through discovering that good results may be obtained by adding a rare earth element to a Sn—Ag alloy or a Sn—Ag—Bi—Cu alloy in the course of evaluating properties thereof by adding various chemical elements.

To this end, in one aspect of the present invention, there is provided a solder alloy composition comprising a Sn—Ag alloy and a rare earth element.

The composition of the Sn—Ag alloy as a base alloy is preferably approximately 0.1 to 6.0 percent by weight of Ag-and the balance is substantially Sn, that is, the Sn—Ag alloy composition is preferably significantly similar to a eutectic composition. When the content of Ag does not reach the value mentioned above, wettability will decrease and melting point will increase.

In contrast, when the content of Ag exceeds the value mentioned above, needle crystals will precipitate and mechanical strength will decrease. In addition, melting point will increase.

In another aspect of the present invention, there is provided another solder alloy composition comprising a Sn—Ag—Bi—Cu alloy and a rare earth element.

The composition of the Sn—Ag—Bi—Cu alloy as a base alloy is preferably not more than 6.0 percent by weight of Ag, not more than 8.0 percent by weight of Bi, and not more than 5.0 percent by weight of Cu, and the balance is substantially Sn.

The composition of the Sn—Ag—Bi—Cu alloy is more preferably 1.5 to 3.0 percent by weight of Ag, 0.5 to 5.0 percent by weight of Bi, and 0.1 to 3.0 percent by weight of Cu, and the balance is substantially Sn.

When the content of Ag does not reach the value mentioned above, an angle of contact becomes larger in wettability evaluation and good wettability will not be obtained. In addition, melting point will increase.

Meanwhile, when the content of Ag exceeds the value mentioned above, the melting point will also increase, needle crystals will be observed, and mechanical strength will decrease.

When the content of Bi does not reach the value mentioned above, melting point will increase and good wettability will not be obtained.

When the content of Bi exceeds the value mentioned above, the solder alloy composition is brittle and a disconnection thereof may occur by mechanical impact or the like.

In contrast, when the content of Cu does not reach the value mentioned above, melting point will not decrease and good wettability will not be obtained.

When the content of Cu exceeds the value mentioned above, a η-type intermetallic compound of Cu—Sn will form and will precipitate, so that cracks will easily occur.

Moreover, melting point will increase and wettability will decrease.

In each solder alloy composition, the phrase "the balance being substantially Sn" means that the balance is substantially pure Sn, which may contain incidental impurities.

An amount of a rare earth element is preferably not more than 5 percent by weight of each of solder alloy compositions, Sn—Ag alloy and Sn—Ag—Bi—Cu alloy.

Even a small amount of approximately 0.1 percent by weight of a rare earth element contributes to improved mechanical strength. When the amount of a rare earth element exceeds 5 percent by weight; however, effects of decreased oxidation resistance, wettability, and mechanical strength begin to appear.

In each solder alloy composition, a rare earth element to be added is preferably selected from the group consisting of La, Ce, Pr, Nd, Sm, and Gd. One or more rare earth elements are to be added to each solder alloy composition.

The mechanism of the effects caused by adding a rare earth element to the solder alloy composition according to the present invention is not clearly understood; however, addition of a proper amount of a rare earth element is capable of improving mechanical strength while maintaining nearly the same melting point and wettability.

BRIEF DESCRIPTION OF THE DRAWING

The FIGURE is a phase diagram of a Sn—Ag alloy.

DESCRIPTION OF THE PREFERRED EMBODIMENT

A solder alloy composition according to the present invention will be described in further detail.

The solder alloy composition of the present invention can be prepared by weighing, heating, melting, and mixing each element so that the content of each element meets a desired content in a finished state of the solder alloy composition. In practice, by adding a rare earth element, which is readily susceptible to oxidation, to Sn melted at 400° C. in a non-oxidized state in noble gases such as Ar, in $N_2$ gas, in $SF_6$ gas, or in a vacuum so that the content of the rare earth element is approximately 2 percent by weight, a Sn-rare earth element base alloy is obtained. Subsequently, a Sn—Ag-rare earth element solder alloy composition is obtained by adding predetermined weights of Sn and Ag, respectively.

By adding, respectively, predetermined weights of Sn, Ag, Bi, and Cu to the Sn-rare earth element base alloy, a Sn—Ag—Bi—Cu-rare earth element solder alloy composition is obtained.

The melting point, wettability, and mechanical strength of each solder alloy composition obtained as described above were evaluated. Next, the measurement method for each evaluated characteristic will be described.

MELTING POINT

The melting point of a solder alloy composition is measured by use of a DSC (Differential Scanning Calorimeter), a method of thermal analysis, in which the rate of temperature increase is 5° C./min and the temperature range is from room temperature to 250° C. The measurement is performed in a $N_2$ atmosphere with 50 sccm of $N_2$. For the DSC, Al sample pans are used, and $Al_2O_3$ is used as a reference sample.

WETTABILITY

For evaluating wettability of a solder alloy composition, an expansion ratio of a molten solder alloy composition is measured. An oxidation treated copper plate is used as an object for measuring wettability.

An oxidation treated copper is obtained by polishing to remove native oxide layers on a surface of a 0.3 mm-thick, 50 mm by 50 mm copper plate followed by forming new oxide layers by a heat treatment at 150° C. for one hour in a thermostatic oven.

A block of each solder alloy composition of approximately 0.3 g is placed on the oxidation treated copper plate and flux (KOUKI Company, JS64MSS) is dripped on the block. The solder alloy composition in the state described above is placed gently on a polyimide film disposed on a static solder bath maintained at 250° C., and is melted for 30 seconds. After cooling, a thickness of a solder alloy composition expanded and solidified on the oxidation treated copper plate is measured by a micrometer and then an expansion ratio is calculated based on the equation below.

Expansion ratio=$(D-H)/D \times 100$ (%)

where H: thickness of solder alloy composition when expanded and solidified (mm);

D: diameter when solder alloy composition is assumed to be spherical (mm);

$D=1.24 \times (W/\rho)/3 \times 10$ (mm);

W=weight of solder alloy composition; and $\rho$=specific gravity of solder alloy composition, herein set to be 7.3 (constant). The greater the expansion ratio, the better the wettability.

MECHANICAL STRENGTH

Each heated molten solder alloy composition is injected in a mold with an inner diameter of 4 mm so that test pieces with a diameter of 4 mm and a length of 4 to 5 cm are formed. After fixing a test piece in the chucks of a tensile strength testing machine, the stress and the strain (the elongation) are measured until the test piece breaks; the gap length between chucks is 10 mm, the cross head speed is 10 mm/min, and the sampling rate is 10 points/sec.

In the actual measurement, four characteristics are measured: the maximum load stress, the rupture stress, the maximum load strain, and the rupture strain.

The maximum load stress means the maximum stress when a test piece is uniformly elongated.

The rupture stress means the stress when stress is concentrated at a certain point of the test piece and causes the rupture thereof.

Each stress explained above indicates the strength of the test piece.

The difference in the stresses indicates plasticity of the test piece.

In addition, the maximum load strain means the maximum amount of strain when a test piece is uniformly elongated.

The rupture strain means the amount of strain when stress is concentrated at a certain point of the test piece and causes the rupture thereof.

The difference between the above strains shows the elongation in the region of the plastic deformation of the test piece over that of the elastic deformation thereof.

Therefore, strength, brittleness, and elongation of a solder alloy composition can be evaluated from the stress and the strain at the maximum load and the rupture and from the differences thereof.

EXAMPLES

The present invention will be described particularly in conjunction with Examples, Comparative Examples, and Reference Examples. However, the present invention is not limited to the Examples described below.

Examples 1 to 6 explained below relate to a Sn—Ag-rare earth element solder alloy composition.

Example 1

A Sn—La base alloy was prepared by adding La to Sn melted at 400° C. in a non-oxidizing atmosphere so that the content of La in the alloy was approximately 2.0 percent by weight. The composition was adjusted by further adding Sn and Ag to the Sn—La base alloy so that the content of each was in accordance with the equations below.

La/(Sn+Ag)=0.5 percent by weight

Ag/(Sn+Ag)=3.5 percent by weight

Subsequently, by melting the composition described above at 400° C. for 2 hours in a non-oxidizing atmosphere, a Sn—Ag—La solder alloy composition was obtained.

Example 2

A Sn—Ag—Ce solder alloy composition was prepared as in Example 1, except Ce was used in place of La.

Example 3

A Sn—Ag—Pr solder alloy composition was prepared as in Example 1, except Pr was used in place of La.

Example 4

A Sn—Ag—Nd solder alloy composition was prepared as in Example 1, except Nd was used in place of La.

Example 5

A Sn—Ag—Sm solder alloy composition was prepared as in Example 1, except Sm was used in place of La.

Example 6

A Sn—Ag—Gd solder alloy composition was prepared as in Example 1, except Gd was used in place of La.

Comparative Example 1

A Sn—Ag solder alloy composition was prepared as in Example 1, but no rare earth element was added.

Reference Examples 1 to 6

A Sn-rare earth element alloy was prepared by adding a rare earth element to Sn so that the content of the rare earth element became approximately 2 percent by weight; the rare earth elements used were La in Reference Example 1, Ce in Reference Example 2, Pr in Reference Example 3, Nd in Reference Example 4, Sm in Reference Example 5, and Gd in Reference Example 6. Only the melting point of each alloy of the Reference Examples was measured; the melting point of pure Sn was 232.0° C.

The melting points, wettability, and mechanical strength of the Sn—Ag-rare earth solder alloy compositions prepared in Examples 1 to 6 are shown in Table 1 together with those of Comparative Example 1 and Reference Examples 1 to 6. A sample H63 in the bottom row in Table 1 represents a eutectic solder of Sn containing 37 percent by weight of Pb.

The melting points will be discussed first.

The solder alloy composition to which Ce was added in Example 2 was compared to the Sn—Ag alloy in Comparative Example 1 showed a reduction in melting point of 2.4° C. The alloy having other rare earth elements showed no substantial change in melting point.

In wettability, an improvement in the expansion ratio could be observed in the solder alloy composition to which Sm was added in Example 5. No substantial improvement of the wettability of the alloy having other rare earth elements was observed.

In mechanical strength, no particular improvement in the stress of the alloy compositions by adding the rare earth elements was observed. However, each alloy composition including a rare earth element showed substantially higher mechanical strength than that of the Sn—Pb eutectic H63.

In contrast, a good result in strain or an improvement of elongation could be obtained in each alloy including a rare earth element.

Examples 11 to 16 relate to a Sn—Ag—Bi—Cu-rare earth element solder alloy composition.

Example 11

A Sn—La base alloy was prepared by adding La to Sn melted at 400° C. in a non-oxidizing atmosphere so that the content of La in the alloy was approximately 2.0 percent by weight. The composition was adjusted by further adding Sn, Ag, Bi, and Cu to the Sn—La base alloy so that the content of each was in accordance with the equations below. Subsequently, by melting the composition described above at 400° C. for 2 hours in a non-oxidizing atmosphere, a Sn—Ag—Bi—Cu—La solder alloy composition was obtained.

La/(Sn+Ag+Bi+Cu)=0.5 percent by weight

Ag/(Sn+Ag+Bi+Cu)=2 percent by weight

Bi/(Sn+Ag+Bi+Cu)=4 percent by weight

Cu/(Sn+Ag+Bi+Cu)=0.5 percent by weight

Example 12

A Sn—Ag—Bi—Cu—Ce solder alloy composition was prepared as in Example 11, except Ce was used in place of La.

Example 13

A Sn—Ag—Bi—Cu—Pr solder alloy composition was prepared as in Example 11, except Pr was used in place of La.

Example 14

A Sn—Ag—Bi—Cu—Nd solder alloy composition was prepared as in Example 11, except Nd was used in place of La.

Example 15

A Sn—Ag—Bi—Cu—Sm solder alloy composition was prepared as in Example 11, except Sm was used in place of La.

Example 16

A Sn—Ag—Bi—Cu—Gd solder alloy composition was prepared as in Example 11, except Gd was used in place of La.

Comparative Example 2

A Sn—Ag—Bi—Cu solder alloy composition was prepared as in Example 11, but no rare earth element was added.

The melting points, wettability, and mechanical strength of the solder alloy compositions prepared in Examples 11 to 16 and Comparative Example 2 were measured. The measurement results are shown in Table 2.

No. 5107 in Table 2 represents a five-component solder alloy composition of 93.4Sn-2Ag-4Bi-0.5Cu-0.1Ge (each numeral represents percent by weight), which was proposed by the inventors of the present invention in Japanese Patent Application No. 9-348212.

In the melting point, the Sn—Ag—Bi—Cu alloy showed no substantial reduction in melting point by the addition of a rare earth element. However, there was no undesirable increase of the melting point.

In a manner similar to the above, the Sn—Ag—Bi—Cu alloy showed no substantial improvement in wettability in the expansion ratio by the addition of a rare earth element. However, there was no undesirable decrease of the expansion.

In the mechanical strength, an improvement in the maximum stress of the alloys by the addition of the rare earth elements was observed, except in the alloy composition described in Example 16 in which Gd was added. The maximum stress of the alloy composition in Example 16 was equivalent to that of the alloy composition having no rare earth element described in Comparative Example 2. The rupture stress of every alloy composition having a rare earth element was higher than that of the Sn—Pb eutectic H63.

Concerning the strain, i.e., the elongation property of the mechanical strength, the maximum strain and the rupture strain of most alloy compositions having a rare earth element were higher than those of the alloy described in Comparative Example 2.

The present invention has been specifically described; however, the alloy composition of each solder alloy composition and the amount of rare earth element to be added is limited only by the claims.

It is apparent from the explanation heretofore, according to the present invention, that a lead-free solder composition having superior mechanical properties such as stress and strain, and having properties comparable to a conventional lead-free solder in melting point and wettability, may be obtained. Furthermore, the lead-free solder composition, which does not include expensive elements such as Ge, can contribute to cost reduction.

TABLE 1

Sn—Ag-Rare Earth Element Solder Alloy Composition

| | Rare Earth Element | Melting Point (° C.) | Expansion Ratio (%) | Stress (MPa) Maximum | Stress (MPa) Rupture | Strain (%) Maximum | Strain (%) Rupture | Remarks |
|---|---|---|---|---|---|---|---|---|
| EXAMPLE 1 | La | 220.8 | 77 | 56.1 | 19.0 | 41.0 | 131 | S—Ag-Rare Earth Element |
| EXAMPLE 2 | Ce | 218.7 | 77 | 75.7 | 30.7 | 36.2 | 89.1 | |
| EXAMPLE 3 | Pr | 232.1 | 75 | 75.1 | 29.4 | 35.4 | 71.2 | |
| EXAMPLE 4 | Nd | 221.6 | 75 | 69.5 | 24.6 | 37.8 | 94.7 | |
| EXAMPLE 5 | Sm | 221.3 | 78 | 80.5 | 33.3 | 34.4 | 82.7 | |
| EXAMPLE 6 | Gd | 221.0 | 74 | 58.7 | 22.0 | 35.1 | 96.2 | |
| COMPARATIVE EXAMPLE 1 | None | 221.1 | 76 | 76.4 | 29.2 | 31.1 | 74.3 | Sn—Ag |
| REFERENCE EXAMPLE 1 | La | 231.3 | — | — | — | — | — | Sn-Rare Earth Element |
| REFERENCE EXAMPLE 2 | Ce | 231.5 | — | — | — | — | — | |
| REFERENCE EXAMPLE 3 | Pr | 231.4 | — | — | — | — | — | |
| REFERENCE EXAMPLE 4 | Nd | 231.9 | — | — | — | — | — | |
| REFERENCE EXAMPLE 5 | Sm | 231.9 | — | — | — | — | — | |
| REFERENCE EXAMPLE 6 | Gd | 231.5 | — | — | — | — | — | |
| H63 | — | 183 | — | 45.1 | 18.4 | 36.2 | 96.5 | Sn—Pb Eutectic |

Sn—Ag—Bi—Cu-Rare Earth Elememt Solder Alloy Composition

| | Rare Earth Element | Melting Point (° C.) | Expansion Ratio (%) | Stress (MPa) Maximum | Stress (MPa) Rupture | Strain (%) Maximum | Strain (%) Rupture | Remarks |
|---|---|---|---|---|---|---|---|---|
| EXAMPLE 11 | La | 210.3 | 73 | 106 | 19.0 | 56.2 | 65.9 | Sn—Ag—Bi—Cu-Rare Earth Element |
| EXAMPLE 12 | Ce | 210.1 | 74 | 107 | 30.7 | 56.8 | 65.5 | |
| EXAMPLE 13 | Pr | 210.4 | 77 | 103 | 29.4 | 45.9 | 57.0 | |
| EXAMPLE 14 | Nd | 210.3 | 73 | 107 | 24.6 | 64.2 | 81.2 | |
| EXAMPLE 15 | Sm | 210.7 | 74 | 102 | 33.3 | 58.1 | 80.9 | |
| EXAMPLE 16 | Gd | 210.0 | 77 | 92.2 | 22.0 | 47.4 | 68.0 | |
| COMPARATIVE EXAMPLE 2 | None | 210.4 | 75 | 93.0 | 50.2 | 46.8 | 62.4 | Sn—Ag—Bi—Cu |
| No. 5107 | None | — | 81 | 101 | 52.6 | 34.2 | 42.0 | Sn—Ag—Bi—Cu—Ge |
| H63 | — | 183 | — | 45.1 | 18.4 | 36.2 | 96.5 | Sn—Pb Eutectic |

What is claimed is:

1. A solder alloy composition consisting of a Sn—Ag alloy and a rare earth element; wherein said Sn—Ag alloy comprises from 1.5% to 6% by weight of Ag.

2. A solder alloy composition according to claim 1, wherein the amount of the rare earth element is not more than 5 percent by weight of the Sn—Ag alloy.

3. A solder alloy composition according to claim 1, wherein the rare earth element is at least one selected from the group consisting of La, Ce, Pr, Nd, Sm, and Gd.

* * * * *